G. W. DURBROW.
SANITARY FILTERING FAUCET.
APPLICATION FILED NOV. 30, 1906.
966,180.
Patented Aug. 2, 1910.
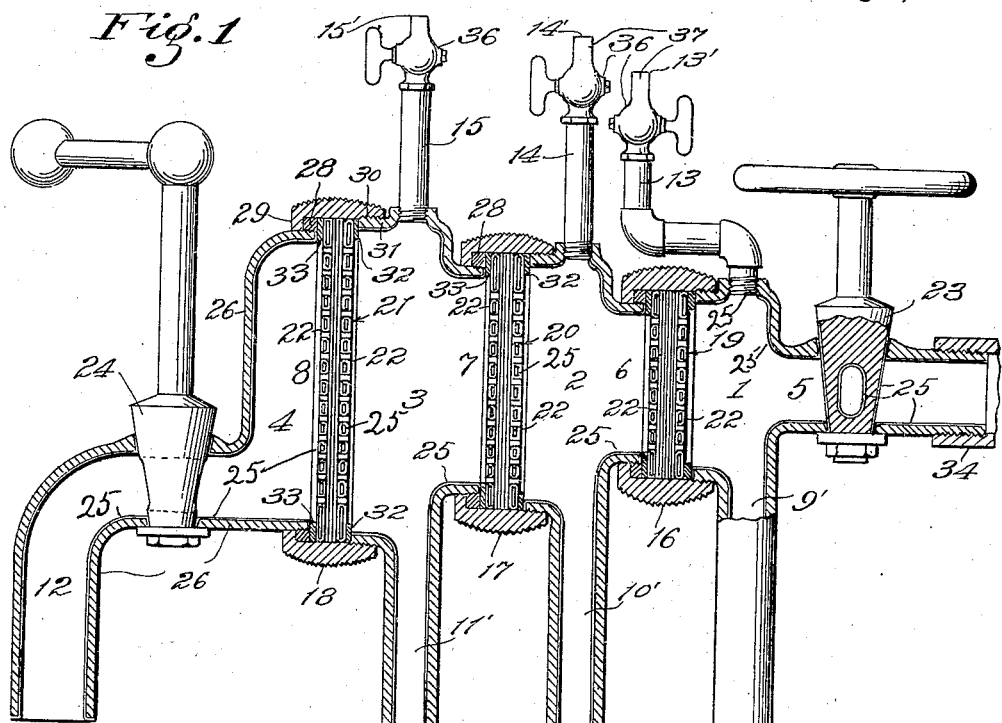
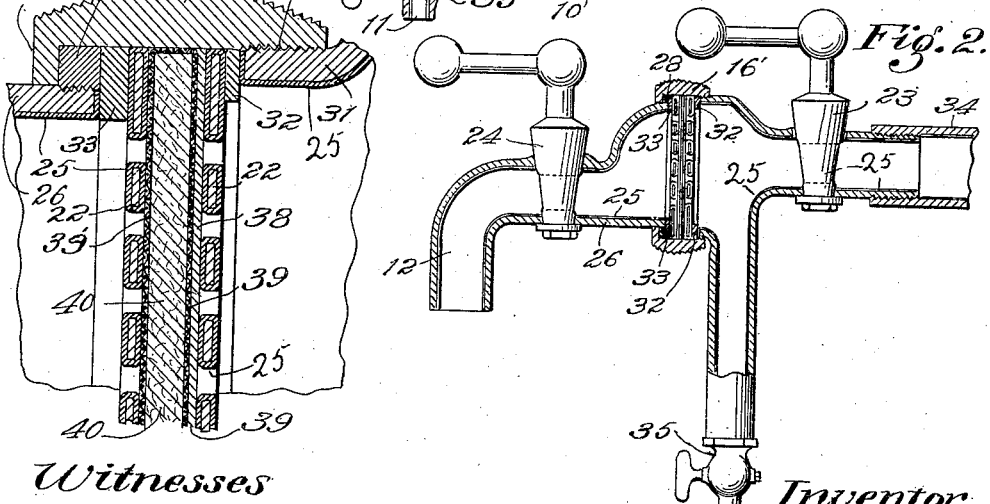
Witnesses
C. C. Holly
Albert H. Merrill
Inventor
George W. Durbrow
by James R. Townsend
his attys.

UNITED STATES PATENT OFFICE.

GEORGE W. DURBROW, OF INDIO, CALIFORNIA.

SANITARY FILTERING-FAUCET.

966,180.      Specification of Letters Patent.      Patented Aug. 2, 1910.

Application filed November 30, 1906. Serial No. 345,847.

*To all whom it may concern:*

Be it known that I, GEORGE W. DURBROW, a citizen of the United States, residing at Indio, in the county of Riverside and State of California, have invented a new and useful Sanitary Filtering-Faucet, of which the following is a specification.

It is of the objects of this invention to provide superior, convenient means for supplying liquid free from suspended or sedimentary foreign matter either in the form of gases or solids; to provide a convenient filter adapted for removing gases from liquids; to provide for rapid, ready and convenient means for cleaning the filter; to provide a filter of the above-mentioned character that can be applied as an ordinary faucet for water service or for the use of rectifiers, distillers, druggists, chemists, and others requiring purified liquid of any kind.

The accompanying drawings illustrate the invention.

Figure 1 is an axial mid-section of a filtering faucet embodying my invention applied with three filtering compartments and installed on a water fixture in position for use. Fig. 2 is a like section of a filter faucet embodying the invention as applied with only one filter section, omitting the trap for gas, air and floating substances. Fig. 3 is an enlarged, fragmental, sectional detail of one of the filter disks and the connections with the faucet shells or sections.

1, 2, 3, 4 designate faucet sections communicating with each other, respectively provided with inlets as the main inlet 5 and the intermediate inlets 6, 7, 8, and each provided with valved outlets, as the intermediate impurity outlets 9, 10, 11, opening from the bottoms of said sections respectively. Said sections, except the final one, 4, are provided with offset receptacles 9′, 10′, 11′, for sedimentary impurities between the main chambers and the valved outlets thereof. Said faucet sections, except the final discharge section 4, having the main or final outlet 12, are provided with offset receptacles 13, 14, 15 for light foreign matter and with valved outlets leading from the tops of said sections, respectively. 13′, 14′, 15′ designate such outlets. The upper and lower outlets of each section are oppositely disposed, and form receptacles adjacent the upstream side of the filters proper as shown, the one for collecting and discharging sediment, and the other for collecting and discharging floating material and gases.

16, 17, 18 designate milled unions adapted to be manually turned without the aid of a wrench and adapted to connect the several faucet sections together with filter sections as 19, 20 and 21, in place between said faucet sections. Said filter sections are preferably approximately equal in diameter to the interior of the unions, and are built up of two external, perforated plates as 22 between which is placed the filtering material which may be variously constructed as hereinafter further explained.

23, 24 are cut-off plugs for the receiving and discharging sections 5 and 12 of the faucet. The several faucet sections when connected together by the union or unions provided for that purpose, form a substantially horizontal conduit across which each filter section extends, as shown. Said filter sections may be diminished in thickness and increased in area according to the duty required, and each faucet may be provided with one or more filter sections according to the purpose for which said faucet is designed. By reason of the connection of said sections by the unions, as shown, any filter section may be easily withdrawn at any time for the purpose of changing or cleansing the same. By providing the oppositely-disposed valved outlets, as 9, 13, 10, 14—11, 15,—each faucet section is provided with means for removing foreign matter from such section. Such foreign matter may consist of oily substances or entangled air or gas, as well as of solid matter held in suspension. In order to make the filtering faucet perfectly sanitary and also to adapt it for use in filtering acid liquids, I have provided a novel improvement in faucets consisting in constructing the interior portion thereof of enamel, shown at 25.

The body or shell 26 of the faucet may be of brass or other strong material, and all the parts with which the liquid may come in contact,—except the actual filtering material,—are covered with said enamel which may be of the usual kinds employed for porcelain or enameled ware. The coating may be of asphaltum or of any material adapted to the purpose for which the particular faucet may be designed.

The perforated plates 22, as shown in the drawings, will preferably be made of perforated steel enameled, the perforations being of sufficient size so that they will not be closed by the enamel, but the enameled surface will extend around through the openings. The filtering material between said plates may comprise disks of filtering substance, as for instance, sheets of asbestos or compressed charcoal, porous disks of silica, or porcelain, the same being confined between the enameled plates, and the perforations through said plates being so far apart that the filtering material will be sustained by the intermediate webbing, and not be forced through by the pressure to which the filter may be subjected in the use to which it is put.

In some instances, the filters may be used for very heavy pressures, and in such case, the filtering material must be more dense than in cases where lighter pressures are employed. The density of each filter section may be varied by employing a greater or less number of disks; as for instance, for high pressures, six sheets of asbestos one thirty-second of an inch thick will resist 200 pounds pressure per square inch, permitting only a small quantity of liquid to pass through and practically excluding all sensible solids.

For rapid filtration, filter sections of less density may be employed, and they may be arranged in series, each succeeding filter being of less density and greater area.

In the drawings 28 designates securing rings screwed on to the intake ends of the several filter sections, and each union is provided with an internal flange 29 to engage said securing rings, and with a female screw 30 to screw on to the spigot 31 or outlet end of the preceding filter-section.

32, 33 designate gaskets of any suitable material to prevent leakage at the joints. It is evident that in some instances rubber gaskets may be used, while in other cases asbestos lead, or other suitable material not subject to attack by the liquid to be filtered, must be employed.

In practical use, the filter may be applied to the supply outlet, as at 34, and the plugs 23, 24 opened, while the other plugs 35, 36 will be closed. The liquid will then pass all of the filter sections and finally flow out through the outlet spout 12. The filter sections will respectively prevent the passage of impurities, and from time to time the obstructing impurities may be drawn off from the several chambers by opening valves 35, 36, whereupon the sediment will be discharged through 35 and the lighter substances through 36. The oppositely disposed outlets of each chamber may be simultaneously opened or may be opened one at a time.

Each of the outlets 35 and 36 may be provided with a nipple 37 to which a hose, not shown, may be attached to lead impurities to a sewer or other place of discharge.

In Fig. 2 a simple form of the device is shown which may be made of convenient size for use by travelers, the same being adapted to be carried in a valise or bag and detachably attached in place to faucets in hotels, in bath-tubs, sinks, wash-basins, etc.

It is evident that a union construction corresponding to that shown in the drawings may be applied to the intake end of faucet section 1 for connection to the hose-tub.

In Fig. 3 I have shown what I at present deem to be the best composition and arrangement of material for filtering water. In this view a disk 38 of asbestos is placed on the inner side of the perforated enameled plate 22 which is at the side next to the incoming water. Next in order is a disk of lint fabric 39. Then follows a body 40 of absorbent cotton; and then another disk 39' of lint fabric next to the down-stream plate 22.

The object of placing the asbestos disk on the upstream side of the filter cage is to provide a smooth, comparatively hard surface from which impurities may be readily washed off by the incoming water when the valved receptacle adjacent the upstream side of said filter cage is opened to discharge the impurities.

The above described combination of disks formed of asbestos, lint fabric and absorbent cotton can, under pressure, be formed into filtering pads for the convenience of travelers or others using the faucet.

When it is necessary to renew the filtering material the union 16' is unscrewed, the filter taken out, and a new pad placed between the disks 22.

The object of the intake cut-off plug 23 is to shut off the liquid at times when the filtering material is to be renewed. The object of the cut-off plug 24 which controls the final discharge opening 12 of the faucet, is to retain the filtering material in a moist condition by closing said plug 24 and opening plug 23. Plug 24 when closed also assists in washing off the upstream sides of the filters proper by maintaining pressure against the downstream side of said filters proper so that the water coming against the upstream sides thereof when plug 23 is opened will all be compelled to escape through the outlets 9, 10, and 11 when the same are opened.

The impurity-collecting receptacles that extend down from the faucet-sections are preferably in the form of a vertical tube provided at the bottom with a cock so that a considerable amount of sediment may collect in the bottom of the tube and may then be drawn off, and that when so collected it is out of the way of the stream on its way to the filter.

What I claim is:—

1. A faucet provided with communicating faucet sections, each provided with an intake, a filtering outlet and oppositely disposed receptacles out of the path of the current adapted to receive foreign matter.

2. A device of the class described provided with a conduit, having a main inlet and outlet, a filter in said conduit, and oppositely disposed auxiliary outlets communicating with said conduit on the upstream side of said filter and adjacent thereto.

3. In combination, a series of faucet sections comprising unions having securing rings screwed on to their intake ends, and each union provided with an internal flange 29 to engage said securing rings and with the female screw 30 to screw onto the spigot 31 or outlet end of the preceding faucet section.

4. In a faucet filter provided with an intake and a discharge, a series of communicating pipe sections between said intake and discharge, unions for connecting said sections together, and filters proper in said sections, said filters proper consisting of outer perforated plates and filtering material between said plates, said unions being adapted to draw said plates toward each other against the filtering material.

5. In a faucet filter provided with an intake and a discharge, a series of communicating sections between said intake and discharge progressively increasing in cross-sectional area from said intake to said discharge, an upright filter proper in each of said sections, and upwardly and downwardly extending receptacles for impurities adjacent the upstream side of each filter proper.

6. A faucet comprising sections, and a union connecting said sections, a filter contained in said union and valved outlets from the section on the upstream side of said filter, one of said outlets being above and the other below said section.

7. A faucet comprising sections, unions connecting said sections, filters in said unions, the sections on the upstream side of said filters being respectively provided with valved outlets from the top and bottom thereof.

In testimony whereof, I have hereunto set my hand at Los Angeles, California, this 23d day of November, 1906.

GEORGE W. DURBROW.

In presence of—
ALBERT H. MERRILL,
JAMES R. TOWNSEND.